US009423056B2

United States Patent
Shikata et al.

(10) Patent No.: US 9,423,056 B2
(45) Date of Patent: Aug. 23, 2016

(54) FLUID CONTROL DEVICE (75) Inventors: Izuru Shikata, Osaka (JP); Tsuneo Yoshida, Osaka (JP); Shinya Nojima, Osaka (JP)

(73) Assignee: FUJIKIN INCORPORATED, Osaka-Shi (JP)

( * ) Notice: Subject to any disclaimer, the term of this patent is extended or adjusted under 35 U.S.C. 154(b) by 233 days.

(21) Appl. No.: 14/118,310

(22) PCT Filed: May 11, 2012

(86) PCT No.: PCT/JP2012/062083
§ 371 (c)(1),
(2), (4) Date: Mar. 3, 2014

(87) PCT Pub. No.: WO2012/160988
PCT Pub. Date: Nov. 29, 2012

(65) Prior Publication Data
US 2014/0239130 A1    Aug. 28, 2014

(30) Foreign Application Priority Data

May 20, 2011    (JP) ................................. 2011-113531

(51) Int. Cl.
*F16K 49/00* (2006.01)
*F16L 3/22* (2006.01)
(Continued)

(52) U.S. Cl.
CPC ................. *F16L 3/22* (2013.01); *F16K 27/003* (2013.01); *F17D 1/04* (2013.01)

(58) Field of Classification Search
CPC ............. F16K 27/003; F16L 3/22; F17D 1/04
USPC .............................. 137/271, 341, 884; 414/14
See application file for complete search history.

(56) References Cited

U.S. PATENT DOCUMENTS 7,726,333 B2 *    6/2010    Hoshi .................. F16K 27/003
                                                         137/341
2001/0020488 A1 *    9/2001    Ishii ...................... F16K 27/003
                                                         137/271
(Continued)

FOREIGN PATENT DOCUMENTS

JP    2001-254900 A    9/2001
JP    2002-206700 A    7/2002
(Continued)

OTHER PUBLICATIONS

International Search Report mailed Jun. 19, 2012, issued for PCT/JP2012/062083.

*Primary Examiner* — Todd M Epps
(74) *Attorney, Agent, or Firm* — Locke Lord LLP; James E. Armstrong, IV; Howard M. Gitten (57) ABSTRACT

Provided is a fluid control device which can shorten an assembling time by facilitating positioning of a line support member and can suppress the increase of a height of a portion which supports fluid control equipment. A base member is formed in a rectangular frame shape by an upper lateral frame member, a lower lateral frame member, and left and right longitudinal frame members which are orthogonal to the upper and lower lateral frame members. A positioning portion for positioning each line support member is provided to the respective lateral frame members. Upper and lower end portions of each line support member are clamped between the respective lateral frame members and upper and lower cover members detachably mounted on the base member in a state where the upper and lower end portions of each line support member are positioned by the positioning portions provided to the respective lateral frame members.

8 Claims, 9 Drawing Sheets

(51) Int. Cl.
*F17D 1/04* (2006.01)
*F16K 27/00* (2006.01)

(56) References Cited

U.S. PATENT DOCUMENTS

2002/0031417 A1* 3/2002 Hoshi .................. F16K 27/003
 414/14
2003/0005959 A1* 1/2003 Yamaji .................. F16K 27/003
 137/341
2012/0192964 A1* 8/2012 Shikata .................. F16K 27/003
 137/343

FOREIGN PATENT DOCUMENTS

| | | |
|---|---|---|
| JP | 2005-034553 A | 2/2005 |
| JP | 2009-204090 A | 9/2009 |
| WO | WO-2005/114016 A1 | 12/2005 |

* cited by examiner

Fig. 10

FLUID CONTROL DEVICE

TECHNICAL FIELD

The present invention relates to a fluid control device used in a semiconductor manufacturing device or the like, and more particularly to a fluid control device which is formed by integrating a plurality of fluid control equipment.

BACKGROUND ART

In a fluid control device used in a semiconductor manufacturing device, the integration of a plurality of fluid control equipment has been underway where a line is formed by arranging the plurality of fluid control equipment in series and by connecting the fluid control equipment not via pipes or joints, and a plurality of such lines are arranged on a base member parallel to each other. It is often the case where such an integrated fluid control device is installed in a housing in a vertical state. Patent literature 1 discloses, as such a fluid control device, a fluid control device where a line is formed by mounting a plurality of fluid control equipment on one movable rail (line support member), a plurality of such lines are provided, and the respective movable rails of the plurality of lines are slidably mounted on a fixed rail (base member) which is directed in the direction orthogonal to these movable rails.

CITATION LIST

Patent Literature

PTL 1: JP-A-2009-204090

SUMMARY OF INVENTION

Technical Problem

According to the above-mentioned conventional fluid control device, by assembling the plurality of fluid control equipment to the movable rail in advance, it is sufficient to perform only mounting of the movable rail on the fixed rail as an operation to be performed in the housing thus giving rise to an advantage that the number of lines can be easily increased (including the change of the lines).

However, in the method of positioning and fastening the movable rail, positioning and fastening of the movable rail are simultaneously performed thus giving rise to a drawback that positioning of the movable rail (line support member) takes a considerable time.

Further, positioning and fixing of the line support member are simultaneously performed using only a fastening member (a bolt or the like) thus providing the structure where a plurality of large stresses (tensile stresses, shearing stresses and the like) are applied to the fastening member (bolt).

Still further, an end portion of the movable rail is made to overlap with the fixed rail and hence, a height of a portion which supports the fluid control equipment becomes a height which is a sum of a height of the movable rail (line support member) and a height of the fixed rail (base member) and hence, a height of the fluid control device which is obtained by adding a height of the fluid control equipment to such a height becomes large thus also giving rise to a drawback that a space (housing) for housing the fluid control device becomes large.

It is an object of the present invention to provide a fluid control device which can shorten an assembling time by facilitating fixing of a line support member.

It is another object of the present invention to provide a fluid control device which can suppress the increase of a height of a portion which supports fluid control equipment.

Solution to Problem

In the fluid control device according to the present invention where a plurality of fluid control equipment are mounted on one line support member, and a plurality of line support members are detachably mounted on a base member, the base member is formed in a rectangular frame shape by an upper lateral frame member, a lower lateral frame member, and left and right longitudinal frame members which are orthogonal to the upper and lower lateral frame members, a positioning portion for positioning each line support member is provided to the respective lateral frame members, and upper and lower end portions each line support member are fixed in a state where the upper and lower end portions of each line support member are positioned by the positioning portions provided to the respective lateral frame members.

In this specification, assume that a view which shows a state where a line support member on which fluid control equipment are mounted is mounted with the fluid control equipment arranged on a viewer's side (FIG. 9) is a front view, and "front", "back", "up", "down", "left" and "right" are determined with reference to this state. Although this state is a typical installation state of the fluid control device, the fluid control device of the present invention is not limited to such an installation state. That is, the fluid control device may be installed such that the base member formed in a rectangular frame shape extends vertically (in the Y direction) or the fluid control device may be installed such that the base member formed in a rectangular frame shape extends horizontally (in the X direction, in the Z direction). Further, when the fluid control device is installed in a vertical state, there may be a case where the upper lateral frame member is arranged along either one of left and right sides, the lower lateral frame member is arranged along the other side, and the respective line support members are horizontally arranged parallel to each other in the vertical direction.

Each line support member may be fixed to each lateral frame member by fitting engagement between both members or by using an additional member (for example, cover member), for example.

It is preferable that each line support member is clamped between the respective lateral frame members and upper and lower cover members detachably mounted on the base member.

The positioning portion formed on each lateral frame member is a recessed portion formed on an upper surface of each lateral frame member, for example, and each line support member is positioned by fitting upper and lower end portions of each line support member into the recessed portions formed on the respective lateral frame members. The constitution for such positioning is not limited to the above-mentioned constitution. The positioning portion formed on each lateral frame member may be formed of a projecting portion, and a recessed portion into which the projecting portion is fitted may be formed on upper and lower end portions of the respective line support members.

It is preferable that a threaded hole is formed in at least both end portions of each lateral frame member, a male threaded member insertion hole is formed on both end portions of the cover member, and the cover member is detachably mounted on the lateral frame member by male threaded members.

Each line support member is formed of a sheet metal, and a body portion of the line support member has an inverse U-shaped cross section. Each lateral frame member is formed of a sheet metal having an approximately lateral U-shaped cross section or is formed of a metal flat bar made of stainless steel or the like, for example. When the lateral frame member has an approximately lateral U-shaped cross section, it is preferable that the lateral frame member is arranged such that the lateral frame member opens on a back surface side, and a recessed portion is formed on an upper wall of the lateral frame member. The longitudinal frame member is formed of a metal sheet, and a body portion of the longitudinal frame member has an inverse U-shaped cross section, for example. The cover member is formed of a metal sheet, and has an approximately L-shaped cross section, for example.

As a fluid control equipment, an open/close valve (a valve which performs closing/opening of a fluid path), a pressure reducing valve, equipment for measuring and displaying a pressure and a flow rate, a flow rate regulator (a flow rate control valve, a thermal mass flow rate control device such as a mass flow controller, a pressure type flow rate control device or the like) may be used.

In one line, for example, a plurality of block-shaped joint members which form a lower-stage layer are mounted on the line support member using male threaded members, a plurality of fluid control equipment which form an upper-stage layer are mounted on the joint members using male threaded members driven from above in a state where the fluid control equipment straddles over the joint members arranged adjacent to each other. Due to such a constitution, the fluid control equipment forming the upper-stage layer can be taken out upwardly in a single form by removing the male threaded member driven from above. The constitution of one line is not limited to the line constitution which is constituted of the lower-stage layer and the upper-stage layer, and various constitutions can be adopted.

In assembling the fluid control device, the line support members on which predetermined fluid control equipment are mounted are sequentially positioned and fixed (an operation of fixing the respective line support members using bolts or the like being eliminated).

When the cover members are used, all line support members may be positioned and, thereafter, the upper and lower cover members may be fixed to the base member (lateral frame members or longitudinal frame members) using bolts or the like.

Due to such a constitution, the own weight of the line support member can be supported by the upper lateral frame member and hence, a burden of a weight imposed on a worker can be reduced whereby a labor for an operation or an operation time can be reduced and, at the same time, a labor for fixing each line support member becomes unnecessary thus largely shortening an assembling time.

It is preferable that each line support member includes an equipment mounting portion having a planar plate shape, and an upper bent portion which is bent toward a back surface side at an upper end side of the equipment mounting portion, upper and lower end portions of the equipment mounting portion are brought into contact with front surfaces of respective lateral frame members, and the upper bent portion is brought into contact with an upper surface of the upper lateral frame member.

Due to such a constitution, the upper bent portion of the line support member is received by the upper surface of the upper lateral frame member so that the own weight of the line support member is supported by the upper lateral frame member, and the increase of a height of a portion which supports the fluid control equipment in the fluid control device can be suppressed.

It is preferable that a projecting portion which extends downward is formed on the upper bent portion of each line support member, and recessed portions which allow fitting of the projecting portion formed on the upper bent portion therein are formed on the upper surface of the upper lateral frame member at predetermined intervals.

The projecting portion formed on the upper bent portion is formed such that a back-surface-side end portion of the upper bent portion is bent downward at a right angle, and a lateral width of the projecting portion is narrowed, for example. Various shapes can be adopted as a shape of the projecting portion, and a shape of the recessed portion formed on the upper lateral frame member can be determined in conformity with the shape of the projecting portion.

Due to such a constitution, in positioning each line support member, it is sufficient to fit the projecting portion formed on the upper bent portion into the recessed portion formed on the upper lateral frame member from above (by making use of the own weight of the line support member) and hence, positioning of each line support member is facilitated.

It is more preferable that the recessed portions formed on the upper lateral frame member are formed at intervals smaller than a pitch of the arrangement of the line support members so that the line support members can be positioned using the plurality of recessed portions at every other recessed portion, at every two other recessed portions or the like.

It is preferable that each line support member further includes left and right bent portions which are bent toward a back surface side on both left and right edges of the equipment mounting portion, and recessed portions which allow fitting of lower end portions of the left and right bent portions therein are formed on an upper surface of the lower lateral frame member at predetermined intervals.

The left and right bent portions are formed in a shape such that the upper and lower end portions of the left and right bent portions are notched so that a vertical length of the left and right bent portions is set shorter than a vertical length of the equipment mounting portion. Accordingly, in both of the case where the upper and lower end portions of the equipment mounting portion are brought into contact with the upper surfaces of the upper and lower lateral frame members and the case where the projecting portion formed on the upper bent portion is fitted into the recessed portion formed on the upper lateral frame member from above, the left and right bent portions do not interfere with the upper and lower lateral frame members.

Due to such a constitution, while reinforcing the equipment mounting portion by the left and right bent portions, positioning of the line support member can be performed by making use of these bent portions. Accordingly, a strength of each line support member can be ensured and, at the same time, the constitution of each line support member can be simplified.

It is preferable that a width in the lateral direction of the recessed portion formed on the lower lateral frame member is set to a size which allows fitting of both of the left bent portion of one of line support members arranged adjacent to each other and the right bent portion of the other line support member in one recessed portion formed on the lower lateral frame member.

To be more specific, a width in the lateral direction of the recessed portion formed on the lower lateral frame member may be set twice as large as a plate thickness of each line support member. By setting the width of the recessed portion in such a manner, the line support members arranged adjacent to each other can be arranged with no gap therebetween and hence, the formation of a play between the respective line support members can be suppressed and, at the same time, a total width in the lateral direction of the device can be decreased.

It is preferable that the recessed portions formed on the lower lateral frame member are also formed at intervals smaller than the pitch of the arrangement of the line support members so that the line support members can be positioned using the plurality of recessed portions at every other recessed portion, at every two other recessed portions or the like. Further, it is more preferable that the width in the lateral direction of the recessed portion formed on the lower lateral frame member is set equal to the width in the lateral direction of the recessed portion formed on the upper lateral frame member.

Advantageous Effects of Invention

According to the fluid control device of the present invention, the base member is formed in a rectangular frame shape by an upper lateral frame member, a lower lateral frame member, and left and right longitudinal frame members which are orthogonal to the upper lateral frame member and the lower lateral frame member, a positioning portion for positioning each line support member is provided to the respective lateral frame members, and upper and lower end portions of each line support member are fixed in a state where the upper and lower end portions are positioned by the positioning portion formed on each lateral frame member. Accordingly, the fixing operation using bolts or the like is unnecessary in positioning each line support member and hence, an assembling time can be largely shortened.

By adopting the constitution where each line support member is clamped between the respective lateral frame members and the upper and lower cover members detachably mounted on the base member, the positioning structure between the line support member and the respective lateral frame member (positioning by fitting engagement between the projecting portion and the recessed portion, for example) and the fixing structure (structure where the line support member is fixed by the upper and lower cover members) are separated from each other. Accordingly, a stress applied to a male threaded member used for mounting the upper and lower cover members is formed of only a stress generated at the time of fixing the line support member by the upper and lower cover members and hence, an undesired stress is not applied to the male threaded member.

Each line support member includes an equipment mounting portion having a planar plate shape, and an upper bent portion which is bent toward a back surface side at an upper end side of the equipment mounting portion, upper and lower end portions of the equipment mounting portion are brought into contact with front surfaces of the respective lateral frame members, and the upper bent portion is brought into contact with an upper surface of the upper lateral frame member. Accordingly, the increase of a height of the portion which supports the fluid control equipment in the fluid control device can be suppressed.

BRIEF DESCRIPTION OF DRAWINGS

FIG. 3(a) to FIG. 3(c) are views showing a line support member of the fluid control device according to the present invention, wherein

FIG. 4(a) to FIG. 4(c) are views showing an upper lateral frame member employed in the fluid control device according to the present invention, wherein

FIG. 5(a) to FIG. 5(c) are views showing a lower lateral frame member employed in the fluid control device according to the present invention, wherein

FIG. 6(a) to FIG. 6(c) are views showing a lower cover member employed in the fluid control device according to the present invention, wherein FIG. 6(a) is a plan view with a part broken away of the lower cover member, FIG. 6 (b) is a cross-sectional view taken along a line b-b in FIG. 6(a), and FIG. 6(c) is a front view with a part broken away of the lower cover member.

REFERENCE SIGNS LIST (30) base member
(31) upper lateral frame member
(32) lower lateral frame member
(33), (34) left and right longitudinal frame members
(36), (37) upper and lower cover members
(40) line support member
(41) equipment mounting portion
(42) upper bent portion
(43), (44) left and right bent portions
(45) projecting portion
(46) recessed portion (positioning portion)
(47) recessed portion (positioning portion)

Description of Embodiments

The embodiment of the present invention is explained hereinafter in conjunction with drawings.

In the explanation made hereinafter, the directions "up", "down", "left" and "right" are determined, in accordance with the directions "up", "down", "left" and "right" in FIG. 9. "front" and "rear" (front surface and back surface) are determined such that a front side of a paper on which FIG. 9 is drawn is referred to as "front" (front surface), and a rear side of the paper on which FIG. 9 is drawn is referred to as "rear" (back surface).

Figure 9:
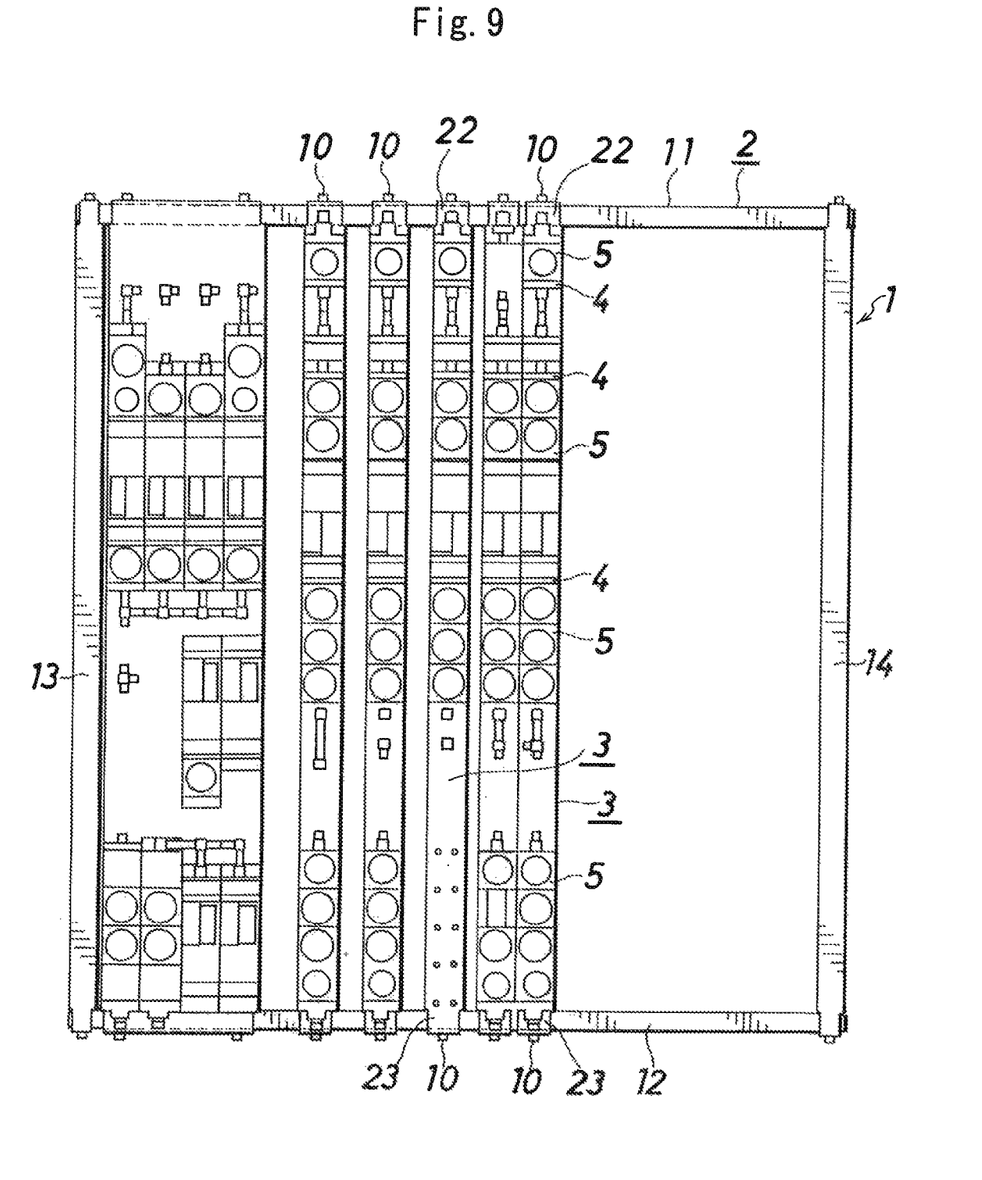
FIG. 9 is a front view showing a fluid control device according to a comparison example provided for comparison with the fluid control device according to the present invention.
Figure 10:
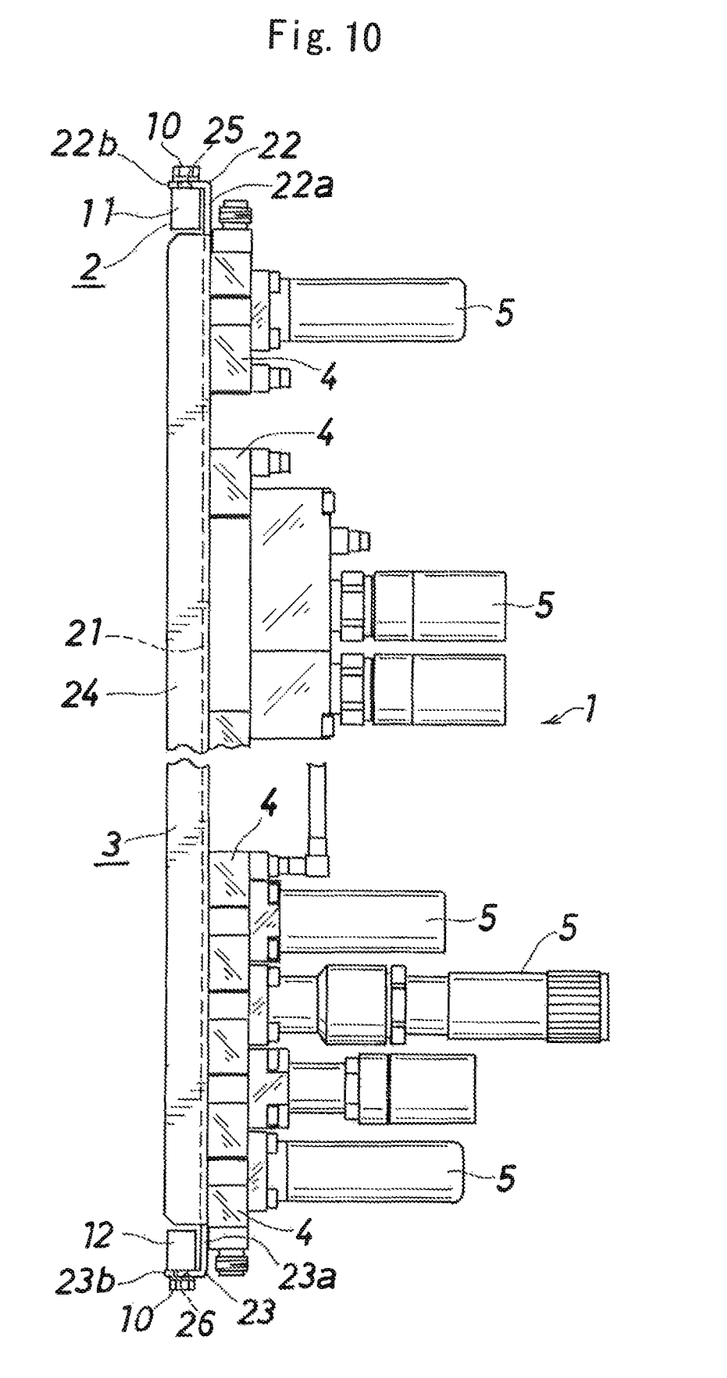
FIG. 10 is a side view of the fluid control device according to the comparison example.

FIG. 9 and FIG. 10 show one example (comparison example) of a fluid control device to which the present invention relates.

A fluid control device (1) includes a plurality of lines. Each line is configured such that a plurality of block-shaped joint members (4) which form a lower-stage layer are mounted on a line support member (3), and a plurality of fluid control equipment (5) which form an upper-stage layer are mounted on the joint members (4) in a state where the fluid control equipment (5) straddles over the joint members (4) arranged adjacent to each other. The respective line support members (3) are detachably mounted on a base member (2) such that the line support members (3) are arranged parallel to each other. Although the respective fluid control equipment (5) have different functions, theses fluid control equipment (5) are known and hence, the fluid control equipment (5) are collectively indicated by symbol (5), and the explanation of the individual fluid control equipment (5) is omitted.

The base member (2) is fixed to a vertical wall surface of a housing, for example, and the change of lines or the increase of the number of lines is performed by mounting or removing the line support member (3) to which the joint members (4) and the fluid control equipment (5) are assembled.

The base member (2) is formed in a rectangular frame shape by an upper lateral frame member (11) which is arranged on an upper side thereof, a lower lateral frame member (12) which is arranged on a lower side thereof, and a left longitudinal frame member (13) and a right longitudinal frame member (14) which are arranged orthogonal to the upper and lower lateral frame members (11), (12).

Each fluid control equipment (5) is fixed to the corresponding joint member (4) by a male-threaded member driven from above. Each joint member (4) is fixed to the line support member (3) by a male-threaded member driven from above.

Each lateral frame member (11), (12) is formed of a flat bar made of stainless steel, and a plurality of threaded holes which penetrate the lateral frame member (11), (12) in the vertical direction are formed in each lateral frame member (11), (12) at predetermined intervals.

The line support member (3) is formed as an integral body by bending a sheet metal, and is constituted of: an equipment mounting portion (21) having a planar plate shape; upper and lower mounting portions (22), (23) which are arranged on both ends of the equipment mounting portion (21), and are formed in a bent shape by bending upper and lower end portions of the equipment mounting portion (21) formed in a planar plate shape respectively; and reinforcing members (24) which are contiguously formed with both edges of the equipment mounting portion (21).

The upper and lower end portions of the equipment mounting portion (21) may take, besides a bent shape formed by bending a sheet metal, any shape such as a bent shape formed of a plurality of members provided that the upper and lower mounting portions (22), (23) having such a shape can acquire the substantially same effect as the upper and lower mounting portions (22), (23) formed by bending a sheet metal.

Each mounting portion (22), (23) of the line support member (3) is constituted of a flat plate portion (22a), (23a) formed in a planar plate shape coplanar with an end portion of the equipment mounting portion (21) and a right-angled portion (22b), (23b) contiguously formed with each flat plate portion (22a), (23a) at a right angle and hence, each mounting portion (22), (23) is formed in an approximately L shape. A through hole (25), (26) which penetrates the right-angled portion (22b), (23b) in the vertical direction is formed in the right-angled portion (22b), (23b).

The upper end portion of the line support member (3) is fixed to the upper lateral frame member (11) in such a manner that the right-angled portion (22b) of the upper mounting portion (22) is made to overlap with an upper surface (outer surface) of the upper lateral frame member (11), and a male-threaded member (10) is threaded into a threaded hole formed in the upper lateral frame member (11) from above (from the outside of) the right-angled portion (22b) of the upper mounting portion (22). On the other hand, the lower end portion of the line support member (3) is fixed to the lower lateral frame member (12) in such a manner that the right-angled portion (23b) of the lower mounting portion (23) is made to overlap with a lower surface (outer surface) of the lower lateral frame member (12), and a male-threaded member (10) is threaded into a threaded hole formed in the lower lateral frame member (12) from below (from the outside of) the right-angled portion (23b) of the lower mounting portion (23).

In fixing the above-mentioned each line support member (3), each line support member (3) can be positioned by merely aligning the through holes (25), (26) formed in the mounting portions (22), (23) with the threaded holes (15) formed in the lateral frame members (11), (12) and hence, each line support member (3) can be easily positioned simply and easily whereby an assembling time can be shortened. Further, with respect to each line support member (3), the right-angled portions (22b), (23b) of the mounting portions (22), (23) formed in a bent shape are made to overlap with the outer surfaces of the lateral frame members (11), (12) respectively and hence, a total height which is attained by combining a height of the base member (2) (lateral frame member (11), (12)) and a height of the line support member (3) is not a height attained by combining a height of the base member (2) and a height of the line support member (3), but is a height attained by the height of the base member (2) and a height of the equipment mounting portion (21) of the line support member (3). Accordingly, the total height attained by combining the height of the base member (2) and the height of the line support member (3) can be decreased compared to a height of the conventional structure attained by combining a height of a fixed rail (base member) and a height of a movable rail (line support member).

In the above-mentioned fluid control device (1), however, it is necessary to mount each line support member (3) using the male-threaded member (10) and hence, the fluid control device (1) has a drawback that the mounting of the line support member (3) requires a considerable labor (a fluid control device disclosed in Patent literature 1 also has the same drawback). The fluid control device according to the present invention is provided for eliminating such a labor required for fixing each line support member (3) in the fluid control device (1) shown in FIG. 9 and FIG. 10. Hereinafter, the fluid control device according to the present invention is explained by illustrating only a support means constituted of a base member (30), line support members (40) and cover members (36), (37) while omitting the illustration of the joint members (4) and the fluid control equipment (5).

Figure 1:
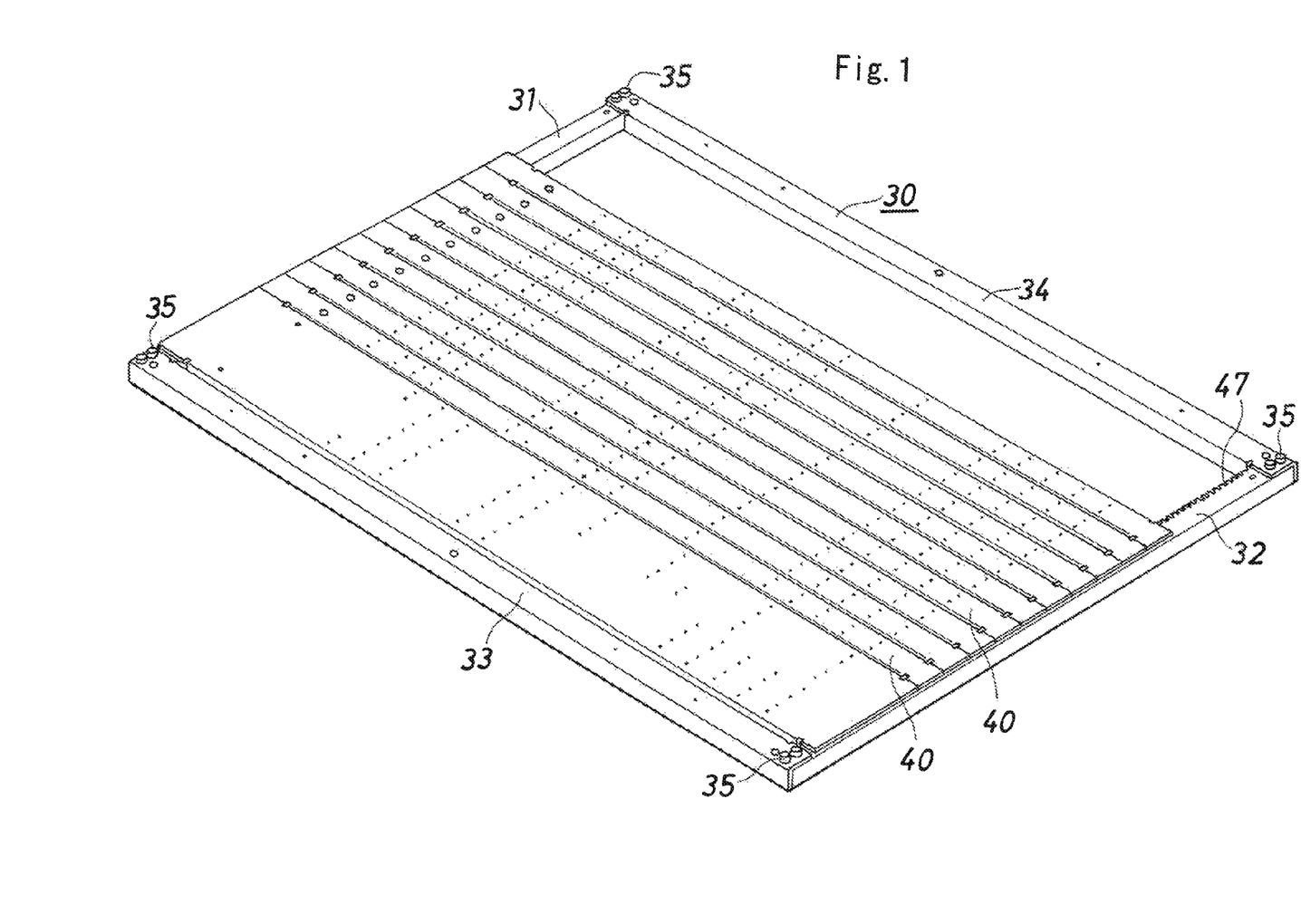
FIG. 1 is a perspective view showing an essential part of an embodiment of a fluid control device according to the present invention in a state where a cover member is omitted.
Figure 2:
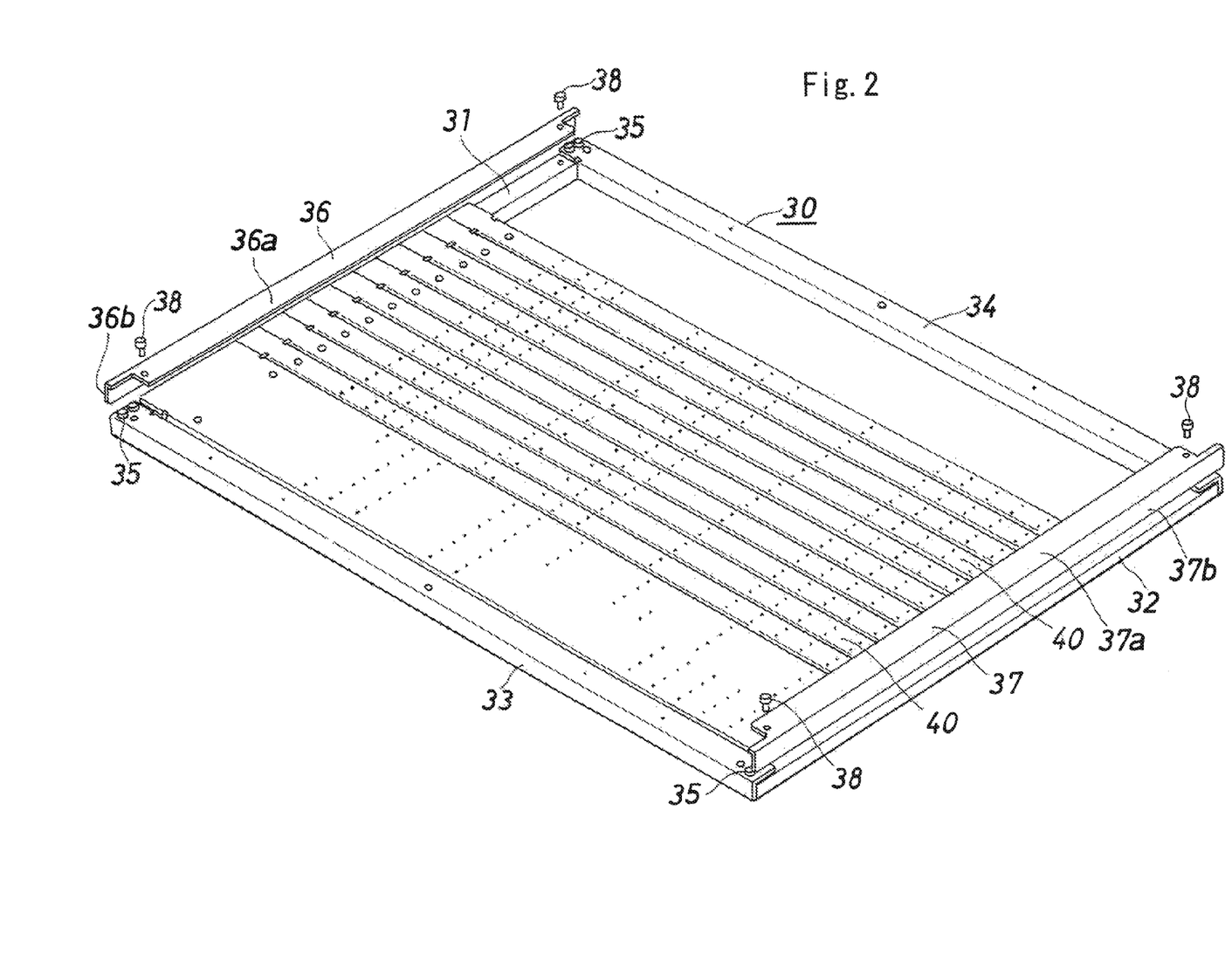
FIG. 2 is a perspective view showing the essential part of the embodiment of the fluid control device according to the present invention in a state where the fluid control device includes the cover member.

As shown in FIG. 1 and FIG. 2, the base member (30) is constituted of an upper lateral frame member (31), a lower lateral frame member (32), and a left longitudinal frame member (33) and a right longitudinal frame member (34) which are orthogonal to the upper lateral frame member (31) and the lower lateral frame member (32). The base member (30) is formed in a rectangular frame shape by fixing both upper and lower end portions of the respective longitudinal frame members (33), (34) to left and right end portions of the respective lateral frame members (31), (32) using male-threaded members (35) such as bolts. As described later, each lateral frame member (31), (32) is provided with the constitution for positioning each line support member (40) (recessed portions (not shown in the drawing) formed on the upper lateral frame member (31) and recessed portions (47) formed on the lower lateral frame member (32)).

As the line support member (40), in addition to a line support member having a narrow width (line support member forming one line) indicated by symbol (40), a line support member having a wide width (line support member forming four lines) is also used. A space for mounting additional lines is ensured at a right portion of the base member (30).

The respective line support members (40) are not fixed to the respective lateral frame members (31), (32) using male-threaded members such as bolts, but are fixed to the respective lateral frame members (31), (32) in such a manner that, as shown in FIG. 2, upper and lower cover members (36), (37) are fastened to the lateral frame members (31), (32) using male-threaded members (38) such as bolts.

Figure 3:
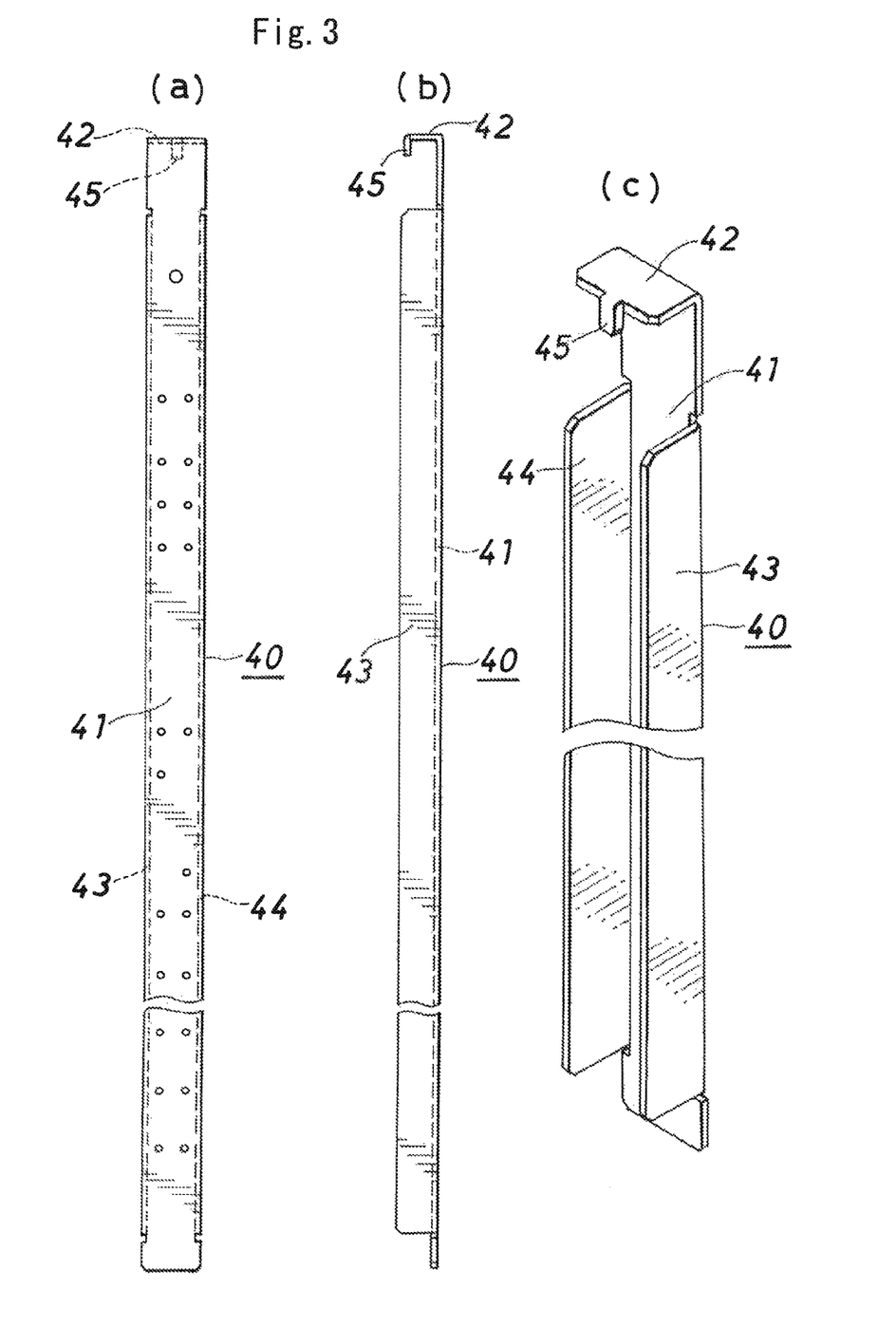
FIG. 3(a) is a front view with a part broken away of the line support member.
FIG. 3(b) is a side view of the line support member.
FIG. 3(c) is a perspective view of the line support member.

As shown in FIG. 3, each line support member (40) includes an equipment mounting portion (41) having a planar plate shape, an upper bent portion (42) which is bent toward a back surface side at an upper end side of the equipment mounting portion (41), and left and right bent portions (43), (44) which are bent toward a back surface side on both left and right edges of the equipment mounting portion (41).

The upper bent portion (42) has a rectangular shape and extends horizontally, and an approximately rectangular-shaped projecting portion (45) which extends downward is formed on a back surface portion of the upper bent portion (42). The left and right bent portions (43), (44) have a vertically elongated rectangular shape, are formed perpendicular to the equipment mounting portion (41) at a right angle, and have a vertical length shorter than a vertical length of the equipment mounting portion (41). The projecting portion (45) is formed by bending a back-surface-side end portion, of the upper bent portion (42) downward at a right angle, and a lateral width of the projecting portion (45) is set narrower than a lateral width of the upper bent portion (42). Although not shown in the drawings, the line support member having a large width which constitutes four lines basically has the same shape as the line support member shown in FIG. 3 and, at the same time, the line support member having a large width is formed in a shape where a projecting portion is formed on left and right sides of the line support member respectively but is not formed on a center portion of the line support member, or in a shape where projecting portions are formed on the line support member at fixed intervals.

Figure 4:
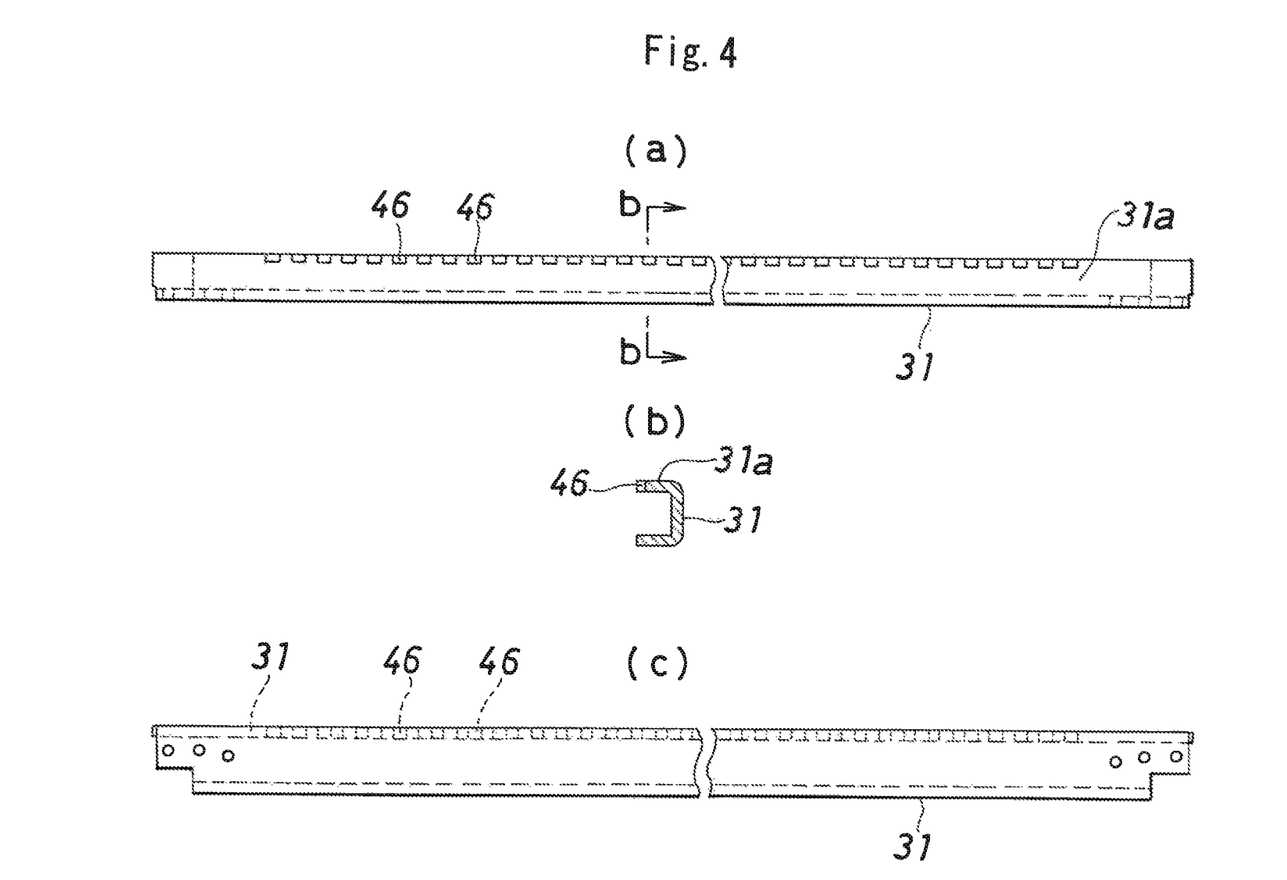
FIG. 4(a) is a plan view with a part broken away of the upper lateral frame member.
FIG. 4(b) is a cross-sectional view taken along a line b-b in FIG. 4(a)
FIG. 4(c) is a front view with a part broken away of the upper lateral frame member.

As shown in FIG. 4, the upper lateral frame member (31) has an approximately lateral U-shaped cross section and opens on a back surface side. Approximately rectangular-shaped recessed portions (46) which allow the fitting of the projecting portion (45) formed on the upper bent portion (42) of the line support member (40) therein are formed on a back surface side of an upper wall (31a) of the upper lateral frame member at predetermined intervals.

Figure 5:
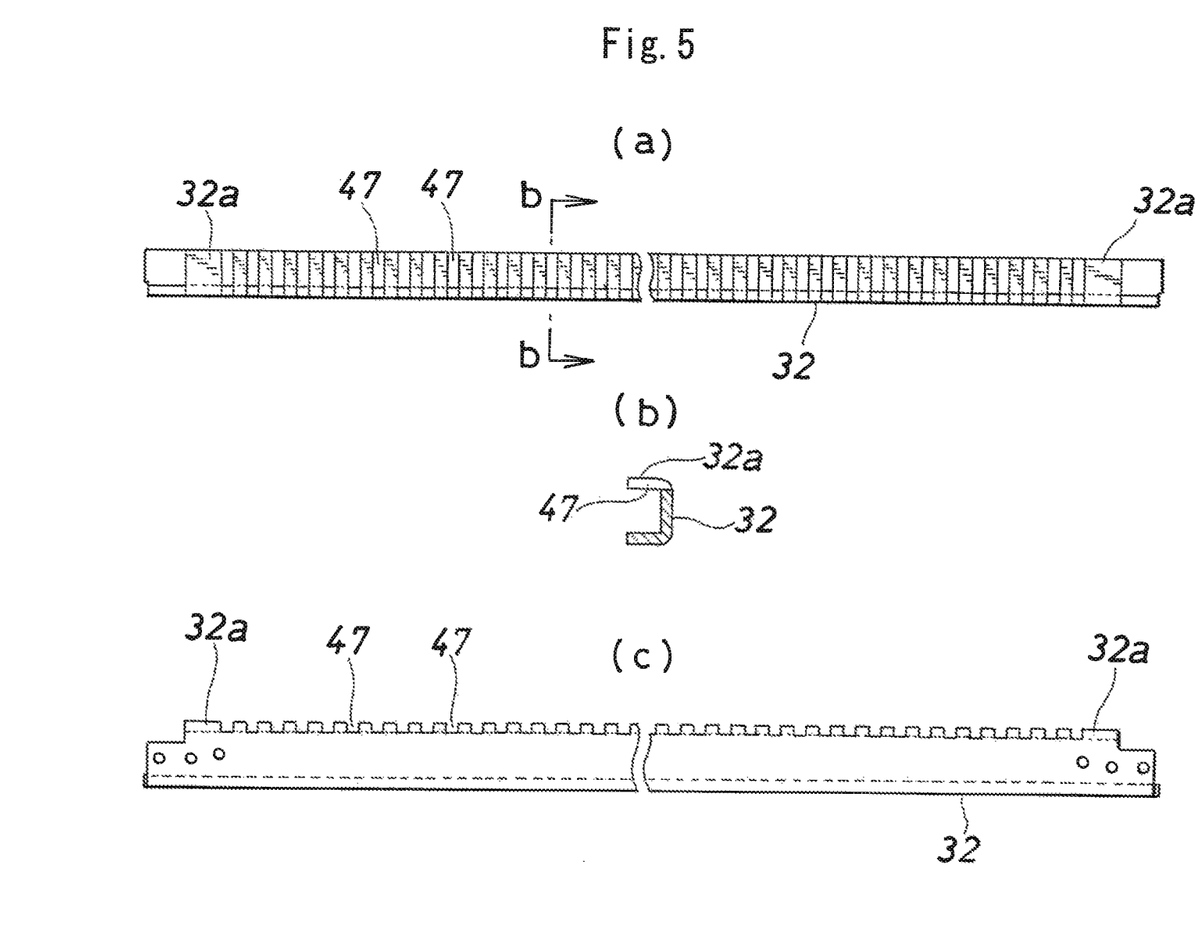
FIG. 5(a) is a plan view with a part broken away of the lower lateral frame member.
FIG. 5(b) is a cross-sectional view taken along a line b-b in FIG. 5(a)
FIG. 5(c) is a front view with a part broken away of the lower lateral frame member.

As shown in FIG. 5, in the same manner as the upper lateral frame member (31), the lower lateral frame member (32) has an approximately lateral U-shaped cross section and opens on a back surface side. Approximately rectangular-shaped recessed portions (47) are formed on an upper wall (32a) of the lower lateral frame member (32) at intervals equal to the intervals of the recessed portions (46) formed on the upper lateral frame member (31). While the recessed portions (46) are formed only on the back surface side of the upper lateral frame member (31), the recessed portions (47) are formed over the whole length of the upper wall (32a) in the longitudinal direction. Lower end portions of the left and right bent portions (43), (44) of the line support member (40) can be fitted into the recessed portions (47).

Figure 6:
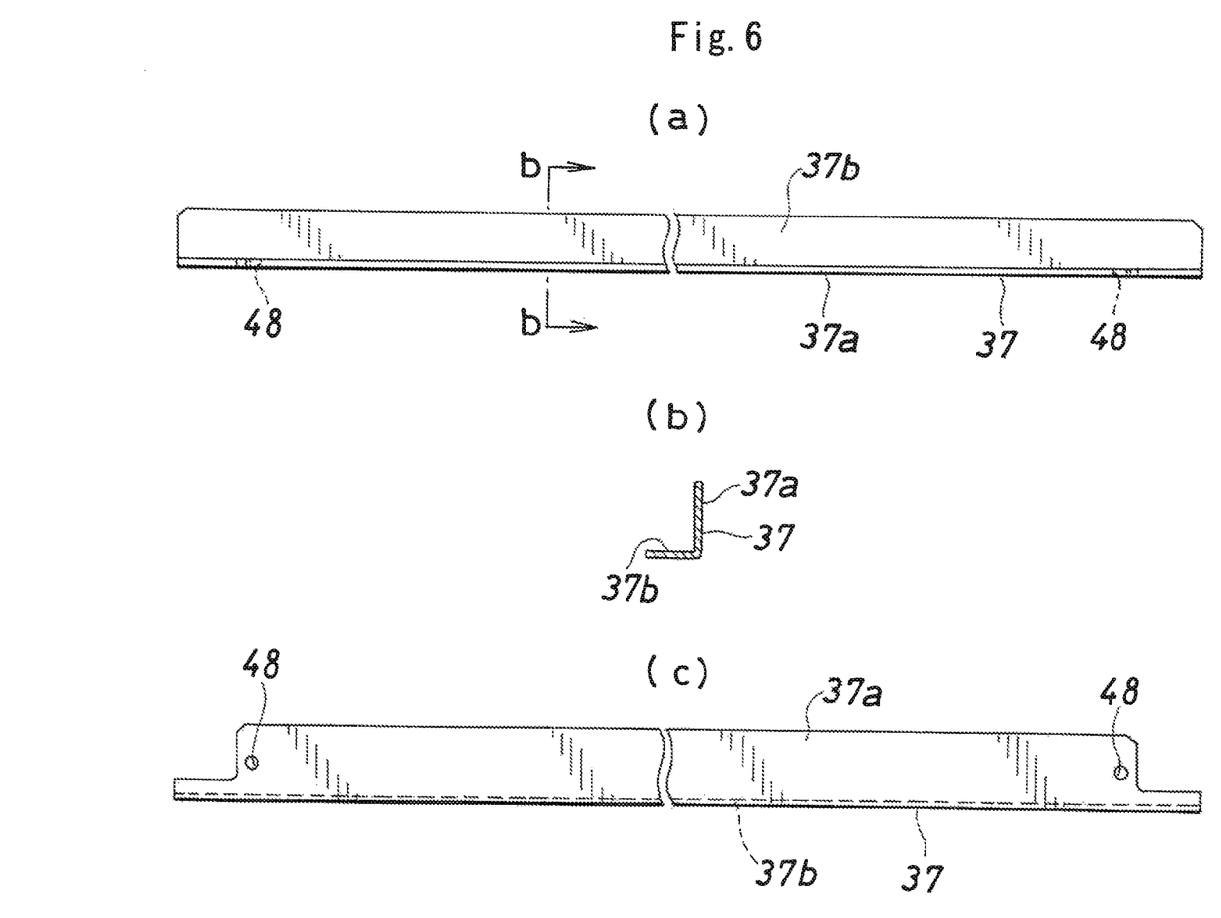

As shown in FIG. 6, the lower cover member (37) (the upper cover member (36) having the same shape as the lower cover member (37)) is constituted of a vertical wall portion (37a) and a horizontal wall portion (37b) thus having an L-shaped cross section. Through holes (bolt insertion holes) (48) are formed in the vertical wall portion (37a).

Figure 7:
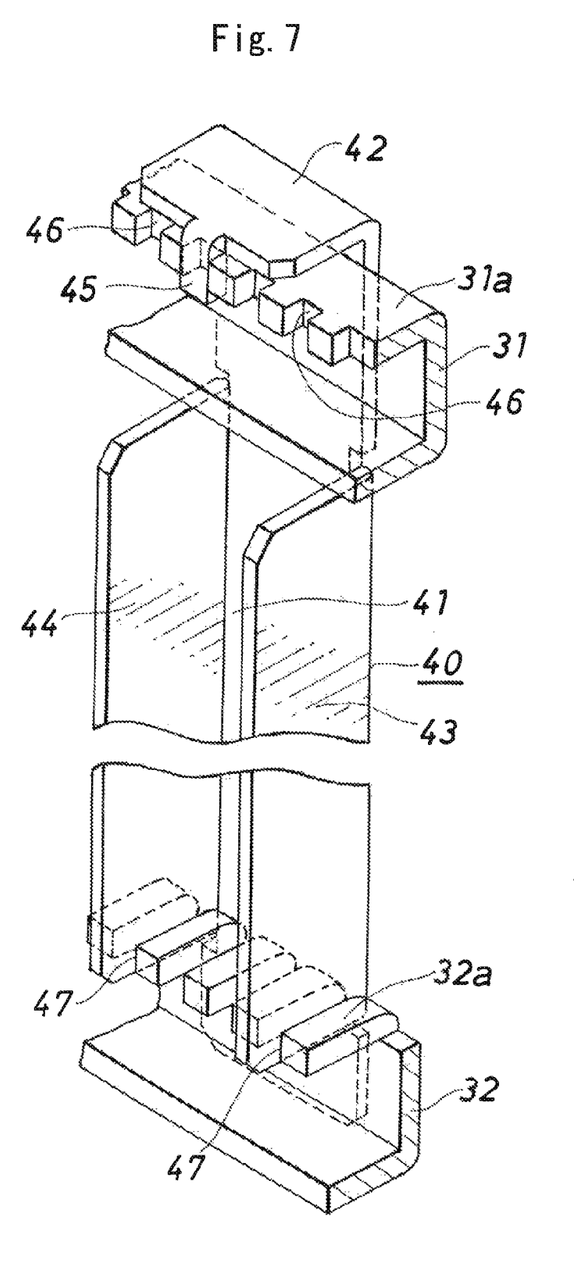
FIG. 7 is a perspective view showing the positioning constitution for positioning the respective line support members and the respective lateral frame members.
Figure 8:
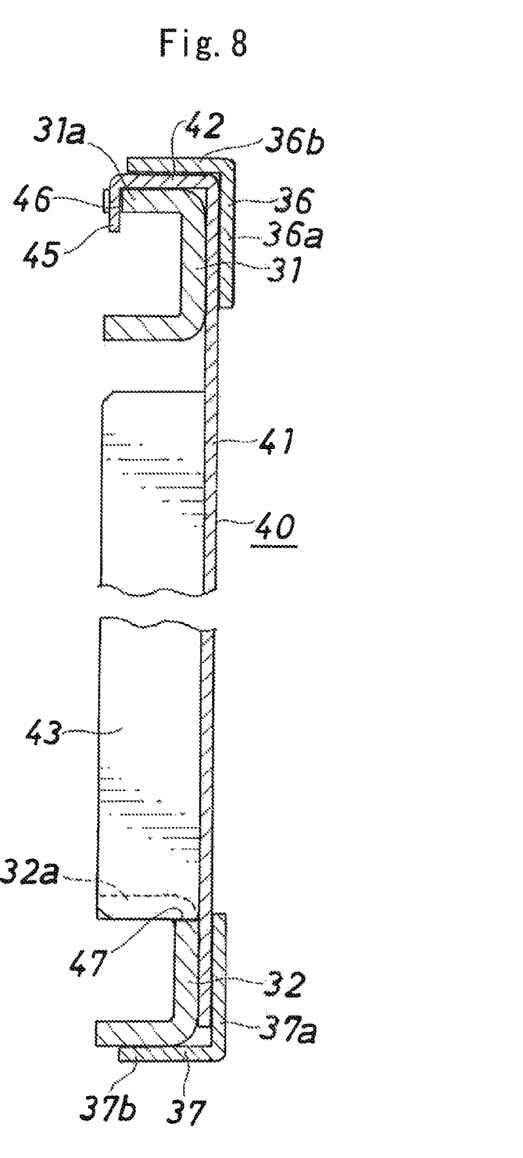
FIG. 8 is a vertical cross-sectional view with a part broken away of an essential part of the fluid control device according to the present invention.

FIG. 7 and FIG. 8 show a state where each line support member (40) and the respective lateral frame members (31), (32) are assembled to each other and are positioned in place.

As shown in these drawings, the projecting portion (45) formed on the upper bent portion (42) of the line support member (40) is fitted into the recessed portion (46) formed on the upper surface (upper wall (31a)) of the upper lateral frame member (31), and the lower end portions of the left and right bent portions (43), (44) of the line support member (40) are fitted into the recessed portions (47) formed on the upper surface (upper wall (32a)) of the lower lateral frame member (32). The left and right bent portions (43), (44) of the line support member (40) have the upper ends thereof positioned below the upper end of equipment mounting portion (41) and the lower ends thereof positioned above the lower end of the equipment mounting portion (41) so as to prevent the left and right bent portions (43), (44) from interfering with the upper and lower lateral frame members (31), (32) in both of the case where the upper and lower end portions of the equipment mounting portion (41) are brought into contact with front surfaces of the upper and lower lateral frame members (31), (32) and the case where the projecting portion (46) formed on the upper bent portion (42) is fitted into the recessed portion (46) formed on the upper lateral frame member (31) from above. With respect to the line support member (40), the upper and lower end portions of the equipment mounting portion (41) are brought into contact with the front surfaces of the respective lateral frame members (31), (32), and the upper bent portion (42) is brought into contact with the upper surface of the upper lateral frame member (31). Due to such a constitution, the upper bent portion (42) of the line support member (40) is received by the upper surface of the upper lateral frame member (31) and hence, the own weight of the line support member (40) is supported by the upper lateral frame member (31).

Accordingly, in positioning each line support member (40), it is sufficient to fit the projecting portion (45) formed on the upper bent portion (42) of the line support member (40) into the recessed portion (46) formed on the upper lateral frame member (31) from above (by making use of the own weight of the line support member (40)) and hence, positioning of each line support member (40) is facilitated. Further, the left and right bent portions (43), (44) reinforce the equipment mounting portion (41). By positioning the line support member by making use of these bent portions, both the ensuring of the strength of each line support member (40) and the simplification of the constitution of each line support member (40) can be acquired.

With respect to a height (a distance between the front surface and the back surface), a total height attained by combining a height of the base member (30) (lateral frame member (31), (32)) and a height of the line support member (40) is not a height attained by combining a height of the base member (30) and a height of the line support member (40), but is a height attained by combining the height of the base member (30) and a height (thickness) of the equipment mounting portion (41) of the line support member (40). Accordingly, the total height attained by combining the height of the base member (30) and the height of the line support member (40) can be decreased compared to a height of the conventional structure attained by combining a height of a fixed rail (base member) and a height of a movable rail (line support member) and hence, the increase of the height of the portion Which supports the fluid control equipment in the fluid control device can be suppressed.

A width in the lateral direction of the recessed portion (47) formed on the lower lateral frame member (32) is set twice as large as a thickness of one of the left and right bent portions (43), (44) of the line support member (40). Accordingly, both the left bent portion (43) of one of the line support members (40) arranged adjacent to each other and the right bent portion (44) of the other line support member (40) can be fitted into one recessed portion (47) formed on the lower lateral frame member (32).

As shown in FIG. 8 (and FIG. 2), a horizontal wall portion (36b) of the upper cover member (36) is brought into contact with the upper surface of the upper wall (31a) of the upper lateral frame member (31), and a vertical wall portion (36a) of the upper cover member (36) is brought into contact with the front surface of the upper end portion of the line support member (40). A horizontal wall portion (37b) of the lower cover member (37) is brought into contact with the lower wall (lower surface) of the lower lateral frame member (32), and a vertical wall portion (37a) of the lower cover member (37) is brought into contact with the lower end portion of the line support member (40).

In assembling the fluid control device of this embodiment, the line support members on each of which predetermined fluid controllers are mounted are sequentially mounted on the base member (30). In mounting the line support members on the base member (30), the projecting portion (45) formed on the upper bent portion (42) of each line support member (40) is fitted into the recessed portion (46) formed on the upper lateral frame member (31), and the lower end portions of the left and right bent portions (43), (44) of the line support member (40) are fitted into the recessed portions (47) formed on the lower lateral frame member (32) thus positioning each line support member (40). After all line support members (40) are positioned in this manner, as shown in FIG. 2, the upper and lower cover members (36), (37) are mounted on the respective lateral frame members (31), (32) using the male-threaded members (38). Due to such an operation, the respective line support members (40) are clamped between the upper and lower lateral frame members (31), (32) and the upper and lower cover members (36), (37) so that the respective line support members (40) on each of Which the fluid controllers are mounted are fixed to the base member (30). Accordingly, an operation of fixing the line support members using bolts or the like is unnecessary at the time of positioning the respective line support members (40) and hence, an assembling time can be largely shortened. The increase of the number of lines, the change of lines or the maintenance of lines may be performed in such a manner that the upper and lower cover members (36), (37) are removed, desired line support members (40) are removed or new line support members (40) are added and, thereafter, the upper and lower cover members (36), (37) are mounted. Accordingly, it is also possible to shorten a time necessary for the increase of the number of lines, the change of the line or the maintenance of the lines.

The left and right bent portions (43), (44) are not necessarily arranged perpendicular to the equipment mounting portion (41). That is, the left and right bent portions (43), (44) can be formed in any shape provided that the left and right bent portions (43), (44) can reinforce the equipment mounting portion (41) and do not interfere with the line support member (40) arranged adjacent to the line support member (40) on which the left and right bent portions (43), (44) are formed at the time of arranging the plurality of line support members (40) parallel to each other. In this case, a shape of the recessed portions formed on the lower lateral frame member (32) may be changed corresponding to the shape of the left and right bent portions (43), (44).

INDUSTRIAL APPLICABILITY

The present invention is preferably applicable to a fluid control device formed by integrating a plurality of fluid control equipment. With the use of the fluid control device according to the present invention, an assembling time can be shortened, and the increase of a height of a portion which supports the fluid control equipment can be suppressed.

The invention claimed is:

1. A fluid control device where a plurality of fluid control equipment are mounted on one line support member, and a plurality of line support members are detachably mounted on a base member, wherein
    the base member is formed in a rectangular frame shape by an upper lateral frame member, a lower lateral frame member, and left and right longitudinal frame members which are orthogonal to the upper and lower lateral frame members,
    a positioning portion for positioning each line support member is provided to the respective lateral frame members,
    upper and lower end portions of said each line support member are fixed in a state where the upper and lower end portions of said each line support member are positioned by the positioning portions provided to the respective lateral frame members, and
    said each line support member includes an equipment mounting portion having a planar plate shape, and an upper bent portion which is bent toward a back surface side at an upper end side of the equipment mounting portion, upper and lower end portions of the equipment mounting portion are brought into contact with front surfaces of the respective lateral frame members, and the upper bent portion is brought into contact with an upper surface of the upper lateral frame member.

2. The fluid control device according to claim 1, wherein a projecting portion which extends downward is formed on the upper bent portion of said each line support member, and recessed portions which allow fitting of the projecting portion formed on the upper bent portion therein are formed on the upper surface of the upper lateral frame member at predetermined intervals.

3. The fluid control device according to claim 2, wherein said each line support member further includes left and right bent portions which are bent toward a back surface side on both left and right edges of the equipment mounting portion, and recessed portions which allow fitting of lower end portions of the left and right bent portions therein are formed on an upper surface of the lower lateral frame member at predetermined intervals.

4. The fluid control device according to claim 3, wherein a width in the lateral direction of the recessed portion formed on the lower lateral frame member is set to a size which allows fitting of both of the left bent portion of one of line support members arranged adjacent to each other and the right bent portion of the other line support member in one recessed portion formed on the lower lateral frame member.

5. The fluid control device according to claim 1, wherein said each line support member is clamped between the respective lateral frame members and upper and lower cover members detachably mounted on the base member.

6. The fluid control device according to claim 5, wherein a projecting portion which extends downward is formed on the upper bent portion of said each line support member, and recessed portions which allow fitting of the projecting portion formed on the upper bent portion therein are formed on the upper surface of the upper lateral frame member at predetermined intervals.

7. The fluid control device according to claim 6, wherein said each line support member further includes left and right bent portions which are bent toward a back surface side on both left and right edges of the equipment mounting portion, and recessed portions which allow fitting of lower end portions of the left and right bent portions therein are formed on an upper surface of the lower lateral frame member at predetermined intervals.

8. The fluid control device according to claim 7, wherein a width in the lateral direction of the recessed portion formed on the lower lateral frame member is set to a size which allows fitting of both of the left bent portion of one of line support members arranged adjacent to each other and the right bent portion of the other line support member in one recessed portion formed on the lower lateral frame member.

* * * * *